(12) United States Patent
Peterkofsky et al.

(10) Patent No.: US 7,552,394 B2
(45) Date of Patent: Jun. 23, 2009

(54) GRAPHICAL USER INTERFACE WITH INTELLIGENT NAVIGATION

(75) Inventors: Roy Isaac Peterkofsky, San Fransicso, CA (US); Vijay Pillarisetti, Fremont, CA (US); Jin Huang, Mountain House, CA (US); Atul Kumar Srivastav, Andhra Pradesh (IN); Roger Goossens, Belmont, CA (US)

(73) Assignee: Oracle International Corp., Redwood Shores, CA (US)

( * ) Notice: Subject to any disclaimer, the term of this patent is extended or adjusted under 35 U.S.C. 154(b) by 360 days.

(21) Appl. No.: 11/242,154

(22) Filed: Oct. 3, 2005

(65) Prior Publication Data

US 2007/0079251 A1   Apr. 5, 2007

(51) Int. Cl.
*G06F 9/00* (2006.01)
(52) U.S. Cl. ...................................... 715/759; 715/806
(58) Field of Classification Search ................. 715/781, 715/804, 806, 759, 853, 854
See application file for complete search history.

(56) References Cited

U.S. PATENT DOCUMENTS

2002/0054141 A1 * 5/2002 Yen et al. ..................... 345/804
2005/0289478 A1 * 12/2005 Landman et al. ............ 715/804

* cited by examiner

*Primary Examiner*—Doug Hutton
*Assistant Examiner*—Daeho D Song
(74) *Attorney, Agent, or Firm*—Kraguwac & Kalnay, LLC

(57) ABSTRACT

Systems, methods, media, and other embodiments associated with facilitating intelligent navigation in a graphical user interface (GUI) are described. One exemplary system embodiment includes a control element configured to facilitate closing a window and identifying a GUI navigation target. The example system may also include a top-level object configured to selectively close an open window descended from a top-level window upon determining that the top-level window is being closed.

27 Claims, 16 Drawing Sheets

GRAPHICAL USER INTERFACE WITH INTELLIGENT NAVIGATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Some types of computer software applications (e.g., analytical applications) may have enormous amounts of complex data available to present. This information may be made available through a graphical user interface (GUI). A GUI may facilitate presenting this data in different windows and may facilitate navigating through these windows using menus, hyperlinks, and so on. Windows in which data may be presented may have attributes (e.g., location, size, ancestors, descendants), may consume resources (e.g., memory, display space), and may be user-configurable. Thus, conventional programs including operating systems, windows managers, and so on may have provided some windows management capabilities. These capabilities may have included, for example, single step linear navigation forward or backward, "favorites" navigation, a history list, window spawning, single window termination, window modality control, and so on. However, when employed in an environment characterized by voluminous information concerning decision making, task analysis, real time analysis, and so on, these capabilities may not have prevented both system resources and user cognitive abilities being overwhelmed.

By way of illustration, in complex analytical applications, analysts may examine several information sets by following multi-step sequences of presentations provided in numerous windows. The sequences may include linear and/or non-linear forward and/or backward navigation through the windows as various mental connections are made (e.g., as a user "drills down" from higher to successively lower levels of data). Furthermore, the sequences may trace paths through different (un)related sets of data available in different windows. Conventionally it may have been difficult, if possible at all, to retrace a path through a non-linear sequence of windows, to collectively remove a subset of windows from a sequence of windows, to intelligently position certain sets of windows, to recycle system resources, and so on. Thus, conventional systems may have provided unsatisfactory support for balancing tradeoffs between displaying sufficient information while managing limited resources (e.g., display space, memory). This may have taxed both user cognition and system performance.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
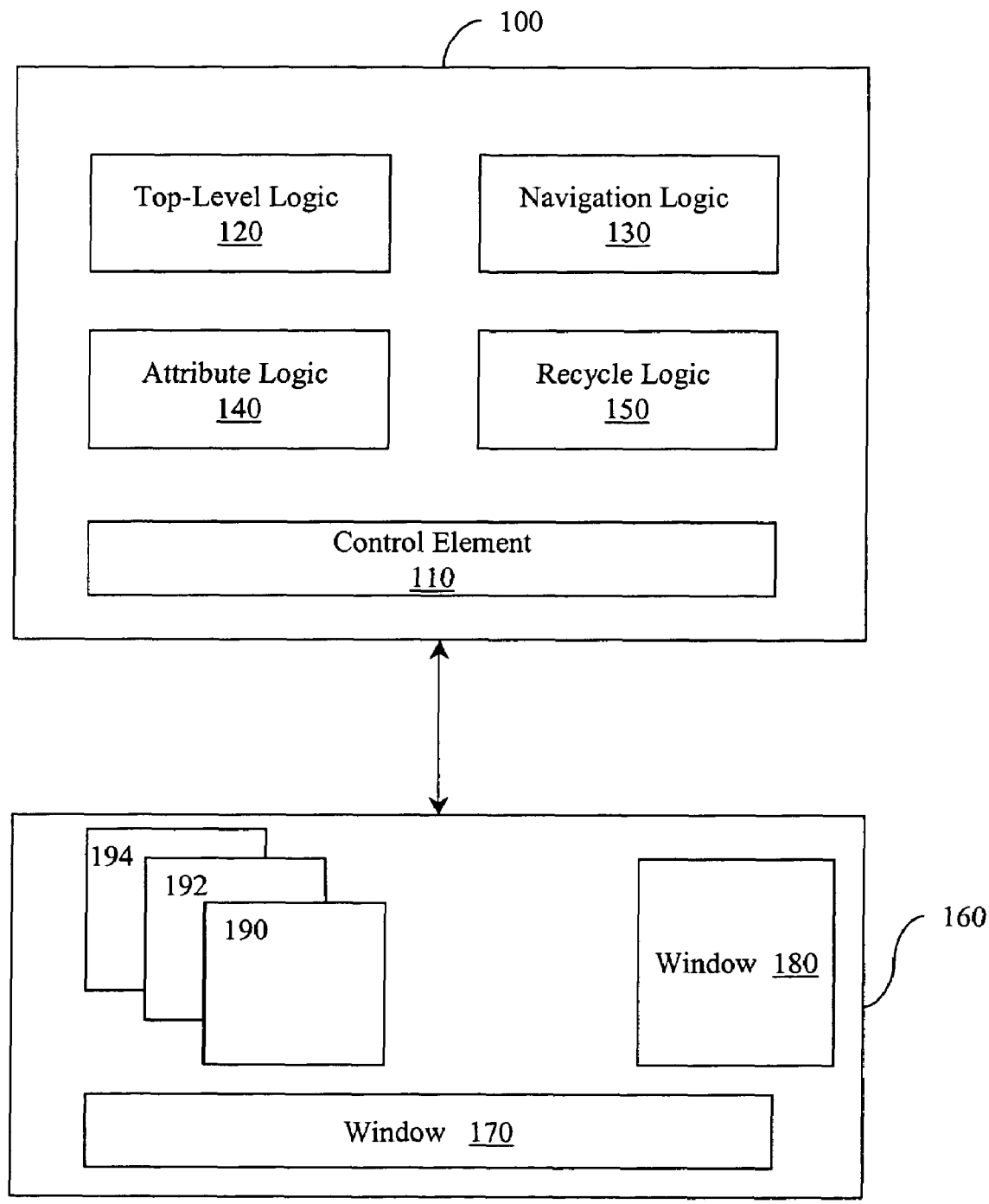
FIG. 1 illustrates an example graphical user interface (GUI) system that facilitates intelligent navigation.

Example systems and methods described herein concern providing intelligent navigation in a graphical user interface (GUI). In some examples, various attributes of elements that provide the intelligent navigation may be user configurable.

A top-level logic may facilitate providing intelligent navigation by providing intelligent window closing. For example, various sequences of windows may be visited from a top-level window (e.g., a window that is the logical starting point of a task or series of related tasks). In some cases it may make sense to automatically close all open descendants of a top-level window when the top level-window is closed, and/or when another top-level window is visited. For instance, going to the logical starting point of a next task may indicate that the previous task is finished and therefore any windows opened to complete the previous task can now be closed. Thus, a "close" button on a top-level window and/or a "close" callback function associated with a top-level window may be configured to do more than just close the top-level window.

A navigation logic may facilitate providing intelligent navigation by tracking sequences of visited windows. Then, rather than simply providing a history list or a single step "back" function, a navigation logic may provide a "jump-back" function. The jump-back function may be associated with a jump-sequence object that intelligently closes sets of windows when non-linear navigation (e.g., going back multiple steps) is undertaken through the jump-back function.

An attribute logic may facilitate recording user preferences concerning attributes including the location, size, shape, and so on of a window and subsequently automatically applying those preferences. While conventional systems may facilitate tiling windows and may even facilitate configuring certain attributes of a window, that information, particularly location and size information, may be lost when a window is closed. Furthermore, configuration information may typically be applied only to a specific instance of a window and may not be applied to logically similar windows encountered in later situations.

Both system resources and human cognitive resources are limited. Thus, a recycling logic may facilitate providing intelligent navigation by selectively recycling previously visited windows when they are no longer useful, needed, and/or logically relevant. Thus, different example systems and methods described herein may employ different combinations of a top-level logic, a navigation logic, an attribute logic, and/or a recycle logic to facilitate providing intelligent navigation in a GUI.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read. In another example, the computer-readable medium has a form of the software/firmware as it is maintained on a server. Other forms may also be used.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms including routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, on the environment in which it runs, and/or on the desires of a designer/programmer and so on. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be fabricated from programming languages and tools including Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium.

"Spread-table", as used herein, refers to a logical and/or physical data structure having an arrangement of data related to how a spreadsheet arranges data, where the data includes embedded navigation links. In a spreadsheet, each cell may store a value and/or a formula from which the value was computed. In a spread-table, a cell may hold a value or a formula plus a link to other data elements. In one example, when a link is selected (e.g., clicked on), a new GUI display element (e.g., window) will be created to display "drill-down" information associated with the link. In this way, sequences of windows may be visited.

"User", as used herein, includes but is not limited to one or more persons, software, computers or other devices, or combinations of these.

"Web" as used herein refers to a web of related data, and not to the World Wide Web (WWW). A web of related data refers to a set of data whose members may be linked to other members in a relational manner that facilitates navigating between them using, for example, a GUI. In one example, a web of data may have a tree organization.

"Window" as used herein refers to a logical collection of data and/or executable code and a logically and physically enclosed area provided on a display by an operating system, window manager, or so on, to display information associated with the collection of data and/or executable code. A window may be managed by the operating system, window manager, or so on. A window may have attributes (e.g., size, shape, location, font, color scheme). A window may display information (e.g., program output, tables, spread-sheets, graphics). A window may be related to (e.g., be parent of, descend from) another window(s).

Figure 3:
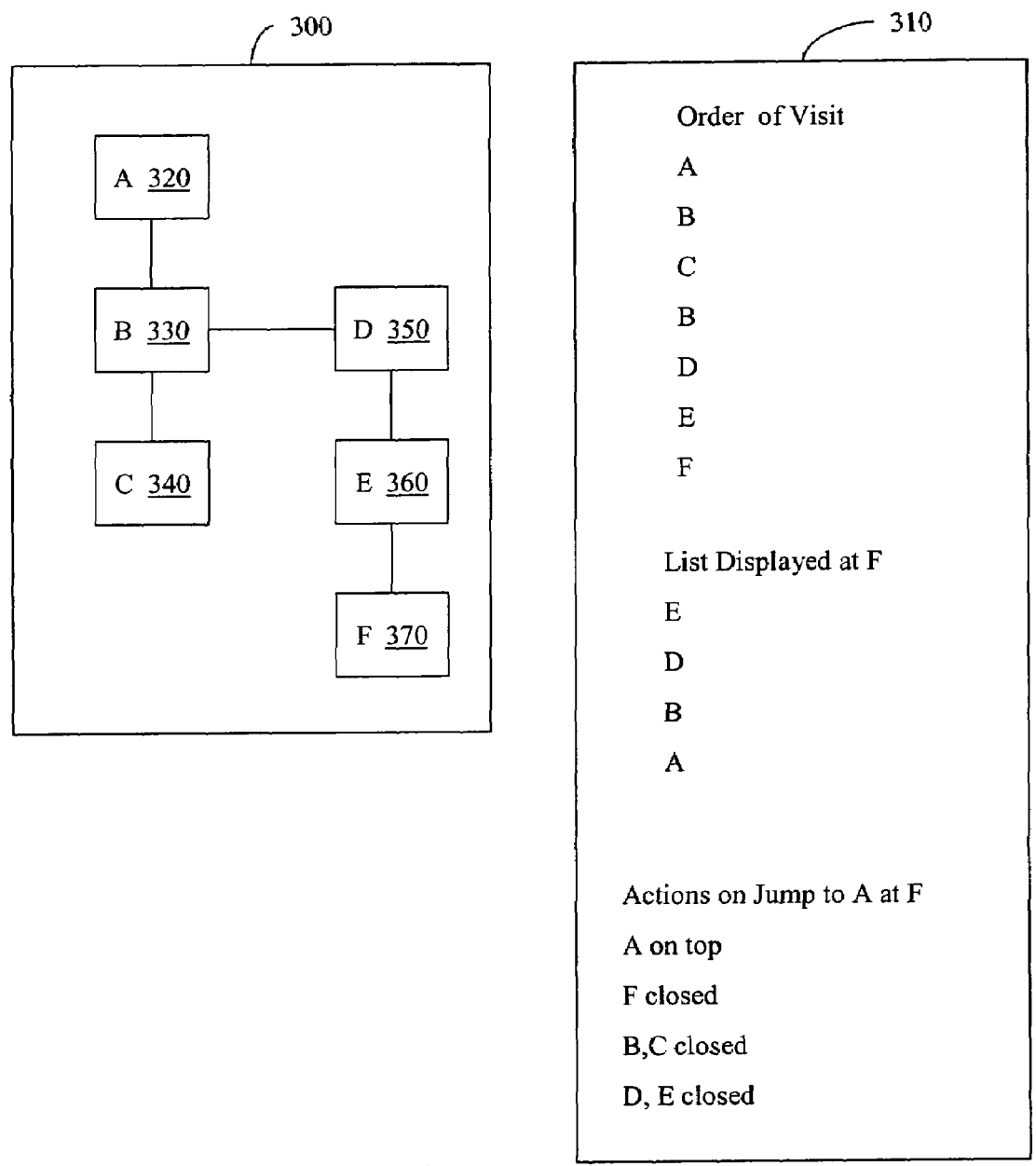
FIG. 3 illustrates an example sequence of visited windows and associated jump back object state.

FIG. 1 illustrates an example graphical user interface (GUI) system 100 that facilitates intelligent navigation. System 100 may include a control element 110 that is configured to facilitate closing a top-level window. Control element 110 may also be configured to facilitate identifying a GUI navigation target. A navigation target is an element (e.g., window) to which a user will navigate. A navigation source is an element (e.g., window) from which a user will navigate. Control element 110 may have a visible component displayed on display 160. Display 160 may, after various user navigations, display a set of related windows. For example, display 160 may display a top-level window 180, a first mid-level window 170, and a set of tiled mid-level windows 190, 192, and 194. FIGS. 8 through 16 illustrate one example display after various user navigations from a top-level window. FIG. 3 illustrates one example navigation and relationships between various windows.

System 100 may also include a top-level logic 120 that is operably connected to control element 110. Top-level logic 120 may be configured to selectively close an open mid-level window that descends from a top-level window. A top-level window may be configured with various characteristics. For example, a top-level window may be a work flow starting point from which a sequence of related mid-level windows may be visited. Furthermore, a top-level window may be an ancestor of all mid-level windows visited in a sequence of windows that started at the top-level window. Thus, a top-level window will not descend from any mid-level window visited in the sequence of windows. In different examples a window may be designated a top-level window in different manners. For example, a top-level window may be defined by a user, may be defined by a system administrator, may be defined by an observation logic, and so on. In one example, a mid-level window may be defined as being a descendant of a top-level window. A mid-level window may be a point from which other mid-level windows are visited. Thus, a mid-level window may have zero or more descendants and one or more ancestors.

In one example, the top-level logic may close a mid-level window descendant when a top-level window parent is being closed. In another example, the top-level logic may selectively close an open mid-level window upon determining that a non-parent top-level window is a navigation target. Thus, rather than a user being required to identify and close undesired windows when moving on to a different analytical process, top-level logic 120 may facilitate intelligently closing undesired and/or logically irrelevant windows. In one example, this intelligent closing feature may be user configurable.

Figure 14:
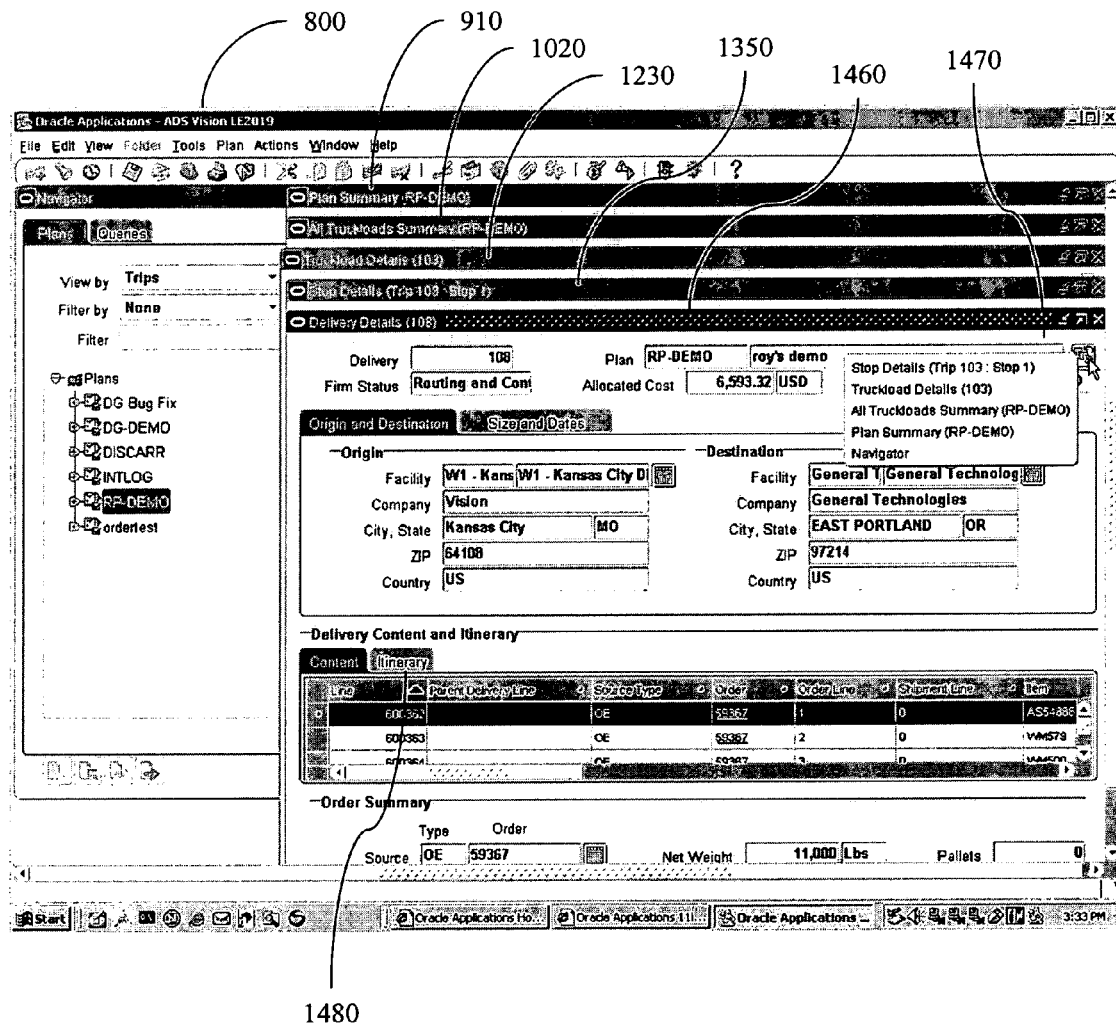

System 100 may also include a navigation logic 130 that is configured to display an ordered set of links to candidate GUI navigation targets. This ordered set may be displayed, for example, as a list in a drop down menu, in a pop-up menu, and so on. An example list and menu are illustrated in FIG. 14, element 1470. While a menu and a list are described, it is to be appreciated that other forms may be employed.

A candidate GUI navigation target may be a window to which a user has previously navigated and that resides in the same logical drill-down path. The window at which a user is currently located may be referred to as a navigation source. A link may be selected (e.g., menu entry clicked on) and followed to bring a desired window to the foreground on a display and to intelligently close selected windows. Thus, navigation logic 130 may also be configured to selectively close a window and to selectively remove an entry associated with the window from the ordered set of navigation links. This closing and removal may be undertaken, for example, upon determining that an already open mid-level window is a GUI navigation target (e.g., user is backing up to this window) and that another mid-level window(s) that descended from the navigation target is open. Similarly, closing and removal may occur upon determining that another mid-level window from which the navigation target does not descend is open. This non-descendant mid-level window may be closed and removed from the open list. In one example, a mid-level window(s) that does not descend from a navigation target may be removed from a jump back list yet still remain open on a display. For example, if the window is part of an active navigation chain associated with another window, then it may remain open on a display even though it is removed from a jump-back list. In one example, the operation of navigation logic 130 may be controllable, at least in part, by user configurable attributes.

In one example, navigation logic 130 may be configured to provide a GUI element (e.g., jump-back button) that is configured to provide non-linear navigation. The non-linear navigation may facilitate moving directly to a window that was previously visited and is still open but which could not be reached directly (e.g., in a single step) through a conventional back button. In this example, the navigation logic 130 may be configured to determine that a navigation link has been selected. When a navigation link is selected, the navigation logic 130 may display a window associated with the navigation link, close a descendant(s) of the window associated with the navigation link, and close a window in which the jump-back button was displayed.

System 100 may also include an attribute logic 140 that is configured to store a user-determined attribute concerning a user-manipulated window. This window may have been resized and/or repositioned by a user. For example, window 170 may initially have been tiled under window 190. However, a user may have decided to view window 170 and window 190 at the same time. Thus, the user may have resized window 170 and/or moved window 170 to a new location. Therefore, attribute logic 140 may be configured to detect the user reconfiguration, to store data concerning the reconfiguration, and upon determining that a subsequent instance of the user-manipulated window is a GUI navigation target to selectively configure the subsequent instance of the user-manipulated window based, at least in part, on the stored attribute(s). Thus, the next time that the user follows a navigation sequence that yields an instance of window 170, that instance may automatically be sized and positioned in the previously sized and positioned location. In one example, the operation of attribute logic 140 may be controllable, at least in part, by user configurable attributes.

System 100 may also include a recycle logic 150 that is configured to selectively recycle an instance of a GUI element type (e.g., window). For example, upon identifying that a pre-determined number of a first type of window (e.g., detail screen) are open and that an additional detail screen has been requested, recycle logic 150 may reuse a detail window (e.g., populate the existing window with new data) rather than creating a new detail window. This recycling may facilitate conserving limited system resources (e.g., memory) and may also facilitate conserving limited display space. In one example, selectively recycling an instance of a GUI element type (e.g., window) may include replacing instance data while maintaining class data. For example, a first instance data associated with a window may be replaced with a second instance data associated with the additional window. System memory, video memory, and so on associated with the window may be retained and updated based on the second instance data. In one example, the operation of recycling logic 150 may be controllable, at least in part, by user configurable attributes. For example, the number of instances of an element may be controlled by a user attribute. In another example, recycle logic 150 may be configured to selectively reuse a GUI element upon determining that a navigation target and a navigation source are both instances of the same GUI element type. In this example, navigation logic 130 may also be configured to selectively update the ordered set of links. Additionally, recycle logic 150 may be configured to selectively reuse a GUI element upon determining that a navigation target and a previous navigation target are both instances of the same GUI element type.

Figure 2:
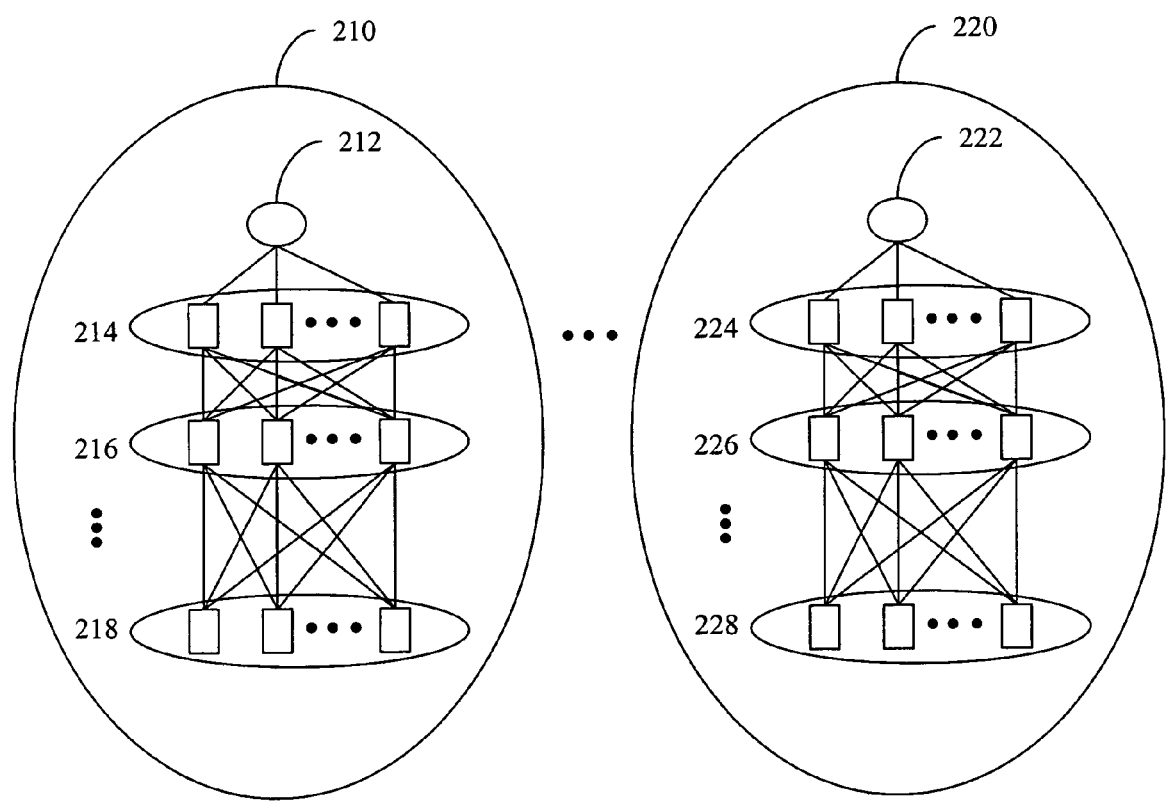
FIG. 2 illustrates an example set of top-level and mid-level windows associated with a web of data.

FIG. 2 illustrates an example collection of top-level and mid-level windows associated with a web of data. The windows may be used, for example, by an analytical application user when examining data and making decisions. A first set 210 of windows may include a top-level window 212 from which various mid-level windows (e.g., 214, 216 through 218) may be reached. Similarly, a second set 220 of windows may include a top-level window 222 from which various mid-level windows (e.g., 224, 226 through 228) may be reached. While two sets of windows are illustrated, it is to be appreciated that a greater and/or lesser number of sets of windows may be involved.

In the illustration, many connections between windows are provided. Thus, numerous different sequences of visits are possible. Conventionally, navigating through a web of data like that illustrated in FIG. 2 using traditional back buttons, window tiling, and favorites list processing may have provided an inefficient, confusing, sub-optimal analytical experience. Thus, example systems and methods described herein provide intelligent navigation including intelligent closing, jump-back processing, stacking, and recycling. These features facilitate efficient, logical navigation through webs of data, thus allowing an analyst to focus on the data being analyzed rather than on the process of accessing the data.

FIG. 3 illustrates an example sequence 300 of visited windows and associated jump back object state 310. In sequence 300, the first window visited is a top-level window A 320. Thus state 310 shows an entry for window A 320 first in an order of visit data structure. The next window visited is B 330 followed by C 340. The user then backtracks and revisits B 330. From B 330 the user navigates in order to D 350, E 360, and F 370.

At this point the user may decide to engage in some non-linear navigation. That is, the user may not wish to navigate to the immediately preceding or following window. Instead the user may wish to navigate to some other window. Therefore, the user may access a control element like a jump-back button. When accessed, the jump-back button may display a list of windows to which a user may navigate. As illustrated in state 310, the list may read E D B A. In this example, the list is ordered from most recently visited to least recently visited and only includes windows in a related "drill-down" sequence. Thus, window C 340 is not included, since it branched off from window B 330 under a different drill down sequence that the user subsequently abandoned. It is to be appreciated that in one example a user may configure a system to display windows in different orders, in different sets, and so on.

From the list, the user may decide to navigate by jumping back to A 320. State 310 displays actions that would be taken upon this decision. For example, the navigation target (A 320) may be brought to the foreground on a display, and the navigation source (F 370) may be closed. Direct (e.g., children) descendants and indirect (e.g., grandchildren) of A 320 are then closed (e.g., B 330, C 340, D 350, E 360). It is to be appreciated that in other examples these operations may be undertaken in other sequences using other groupings. While the example illustrates backward non-linear navigation, it is to be appreciated that forward non-linear navigation may also benefit from the jump-back button. Consider a navigation sequence A-B-C-D-E-C. Complex logic may be needed to maintain the jump-back navigation sequence in a manner that meets user needs. For example, non-linear forward navigation might leave a jump-back list reading C-B-A, indicating that D and E were closed when the user returned to window C; might leave a sequence C-E-D-B-A, indicating that the position of window C in the navigation sequence moved due to its revisitation; or might leave C-E-D-C-B-A, indicating that a user wanted to see the full navigation sequence followed even if it introduces ambiguity among multiple listings of the same window.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional, not illustrated blocks. While the figures illustrate various actions occurring in serial, it is to be appreciated that various actions could occur concurrently, substantially in parallel, and/or at substantially different points in time.

Figure 4:
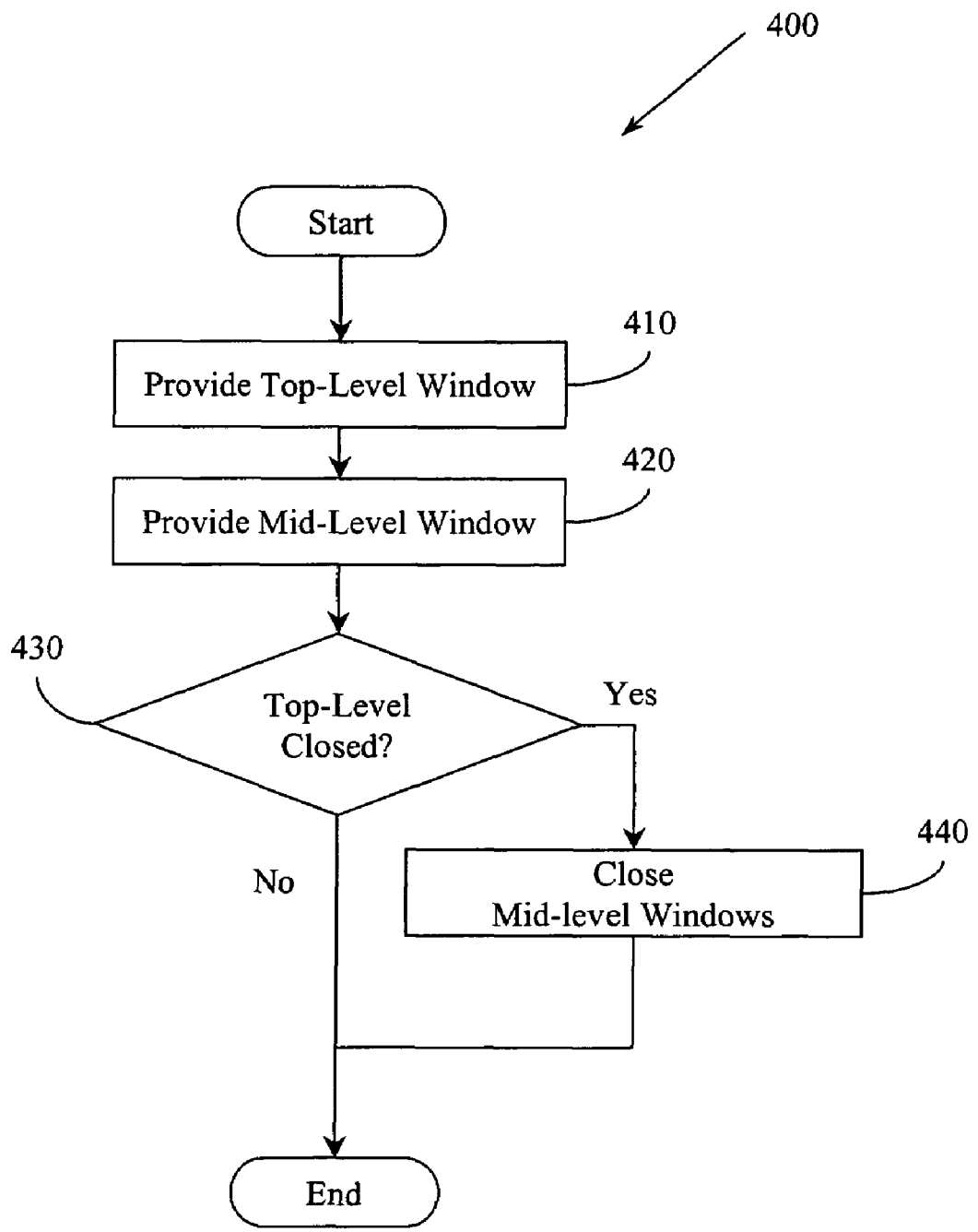
FIG. 4 illustrates an example method associated with providing intelligent navigation in a GUI.

FIG. 4 illustrates an example method 400 associated with facilitating intelligent navigation in a GUI. The illustrated elements denote "processing blocks" that may be implemented in logic. In one example, the processing blocks may represent executable instructions that cause a computer, processor, and/or logic device to respond, to perform an action (s), to change states, and/or to make decisions. Thus, the described methods can be implemented as processor executable instructions and/or operations provided by a computer-readable medium. In another example, the processing blocks may represent functions and/or actions performed by functionally equivalent circuits including an analog circuit, a digital signal processor circuit, an application specific integrated circuit (ASIC), or other logic device.

It will be appreciated that electronic and software applications may involve dynamic and flexible processes. Thus, illustrated blocks may be performed in sequences different than the one shown and/or blocks may be combined or separated into multiple components. Blocks may also be performed concurrently, substantially in parallel, and/or at substantially different points in time.

Method 400 may include, at 410, providing a top-level window. The top-level window may be configured to display information (e.g., data, control, status) associated with an application. Providing a top-level window may include, for example, allocating system resources (e.g., memory, objects, descriptors), allocating display space, configuring the window, and so on. The top-level window may be a point from which other windows may be visited.

Method 400 may also include, at 420, providing a mid-level window(s). Providing a mid-level window may include, for example, allocating system resources, allocating display space, configuring the window, and so on. The mid-level window may be configured, for example, to display information (e.g., data) associated with the application associated with the top-level window. For example, the top-level window may provide control elements (e.g., menus, lists, buttons) that can be used to navigate to a mid-level window. Additionally, the top-level window may display data that may be drilled into and which may therefore spawn a new display window. The data may be part of a web of data. Since mid-level windows are visited from the top-level window or other mid-level windows that descend from the top-level window, the mid-level windows in one visitation sequence ultimately descend from the same top-level window.

Method 400 may also include, at 430, making a determination concerning whether the top-level window is being closed. If the determination at 430 is yes, then method 400 may continue, at 440, by closing a mid-level window(s). Thus, rather than a user having to close all windows related to and descended from the top-level window, as may be required conventionally, intelligent closing may "clean up" after a user when the user goes to a top-level window.

In another example, the determination at 430 may also include identifying whether a user has decided to visit a second un-related top-level window. Upon determining that an un-related top-level window is the navigation target, action 440 may also include selectively closing a top-level window that is not the navigation target, and a mid-leve window(s) descended from the top-level window that is not the navigation target.

While FIG. 4 illustrates various actions occurring in serial, it is to be appreciated that various actions illustrated in FIG. 4 could occur substantially in parallel. By way of illustration, a first process could provide a top-level window, a second process could provide a mid-level window, and a third process could selectively close windows based on top-level window visitation and/or closing. While three processes are described, it is to be appreciated that a greater and/or lesser number of processes could be employed and that lightweight processes, regular processes, threads, and other approaches could be employed.

In one example, methods are implemented as processor executable instructions and/or operations stored on a computer-readable medium. Thus, in one example, a computer-readable medium may store processor executable instructions operable to perform a method that includes providing a top-level window configured to display information associated with an application and that also includes providing a mid-level window(s) also configured to display information associated with the application. The mid-level window will be descended from the top-level window. That means that the mid-level window will be able to trace back through an ancestor(s) (e.g., parent window) to the top-level window. The method may also include relating a jump-sequence GUI element to a mid-level window(s). The jump-sequence GUI element may be configured to provide an ordered list of related, visited, open windows associated with the application. The jump-sequence GUI element may also be configured to selectively close a mid-level window(s) upon determining that the top-level window or another ancestor window is being closed. Additionally, the jump-sequence GUI element may be configured to perform different actions upon determining that the jump-sequence GUI element has been accessed. For example, the jump-sequence GUI element may display the ordered list of related, visited, open windows associated with the application, may determine which visited, open window is the next window to be visited, may close an open window(s) that descends from the next window to be visited, may bring forward on a display the next window to be visited, and may remove entries from the ordered list of related, visited, open windows associated with the application. While the above method is described being stored on a computer-readable medium, it is to be appreciated that other example methods described herein can also be stored on a computer-readable medium.

Figure 5:
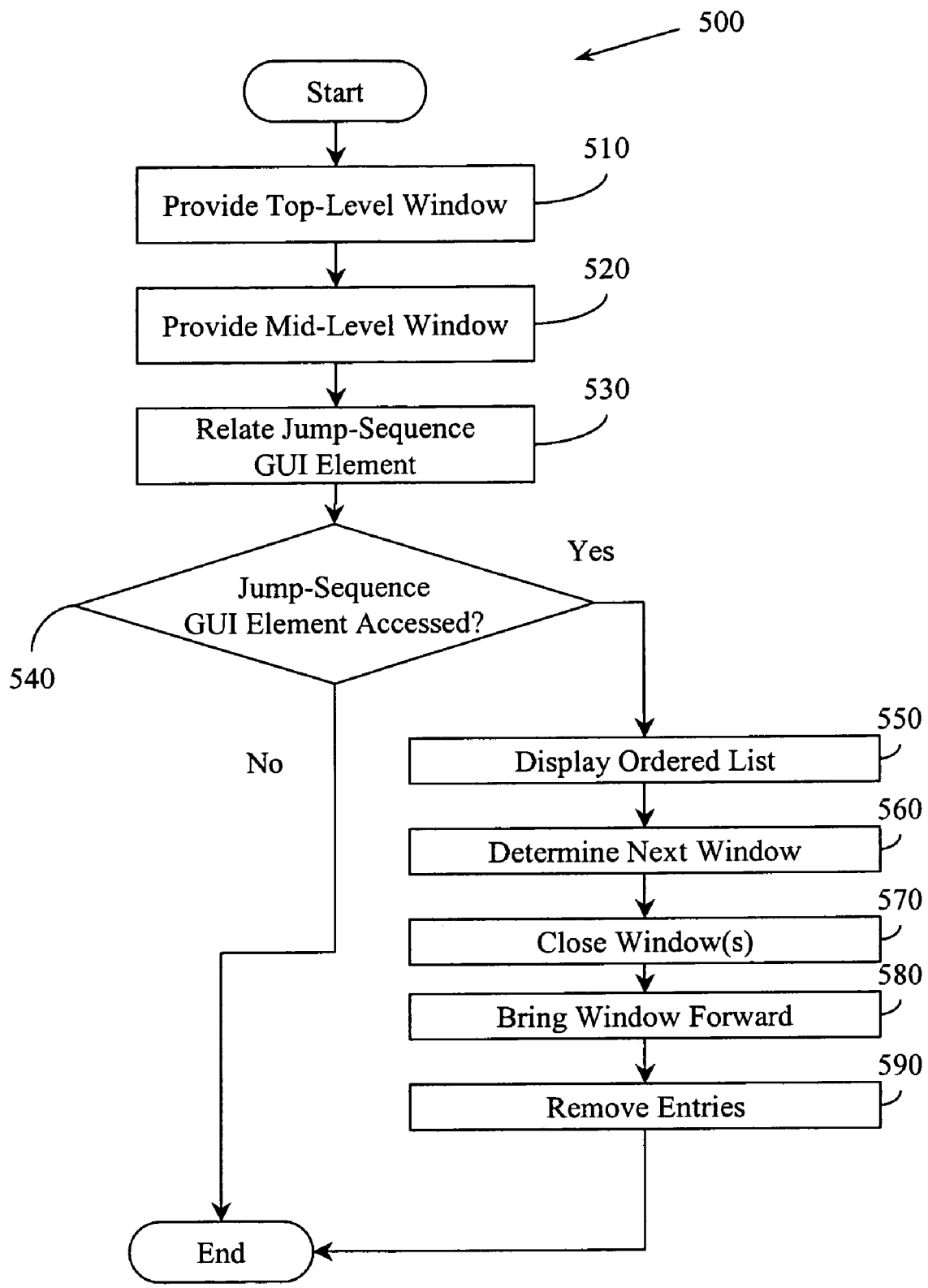
FIG. 5 illustrates another example method associated with providing intelligent navigation in a GUI.

FIG. 5 illustrates an example method 500 associated with providing intelligent navigation in a GUI. Like method 400, method 500 includes providing a top-level window at 510 and providing a mid-level window at 520. Method 500 may also include, at 530, relating a jump-sequence GUI element to a mid-level window(s). The jump-sequence GUI element may be configured to provide an ordered list of related visited, open windows associated with the application. This ordered list may be stored, for example, in a data store including a tree, a list, a heap, an array, a linked list, and so on.

Method 500 may also include, at 540, making a determination concerning whether a jump-sequence GUI element has been accessed. If the determination is yes, then method 500 may, at 550, display an ordered list of related visited, open windows. The jump-sequence GUI element may be, for example, a jump-back button. Thus, the ordered list may be displayed as a menu (e.g., drop-down, pop-up) associated with the jump-back button.

With the ordered list displayed, method 500 may continue, at 560, to determine a navigation target. The navigation target will be, for example, the next window to be visited from among the visited, open windows available in the ordered list. Upon determining which window is the navigation target, method 500 may continue, at 570, by closing an open window (s) that descends from the next window to be visited, by bringing forward at 580 the next window to be visited, and by removing at 590 an entry from the ordered list of related, visited, open windows associated with the application.

As a user navigates through various windows, recycling decisions may be made and recycling actions may be taken. A recycle GUI element may be configured to facilitate reusing GUI elements. In one example, the reuse may include replacing instance data. A GUI element (e.g., window) may be selected for reuse in different ways. In one example, a GUI element may be selected for reuse if a number of active instances of that GUI element type equals a threshold number of active instances for that GUI element type and an additional instance of that GUI element type is requested. Additionally and/or alternatively, a GUI element type may be selected for reuse if the navigation target element type is of the same element type as the navigation source. In another example, a GUI element type may be selected for reuse if a navigation target and a previous navigation target are the same element type.

Figure 6:
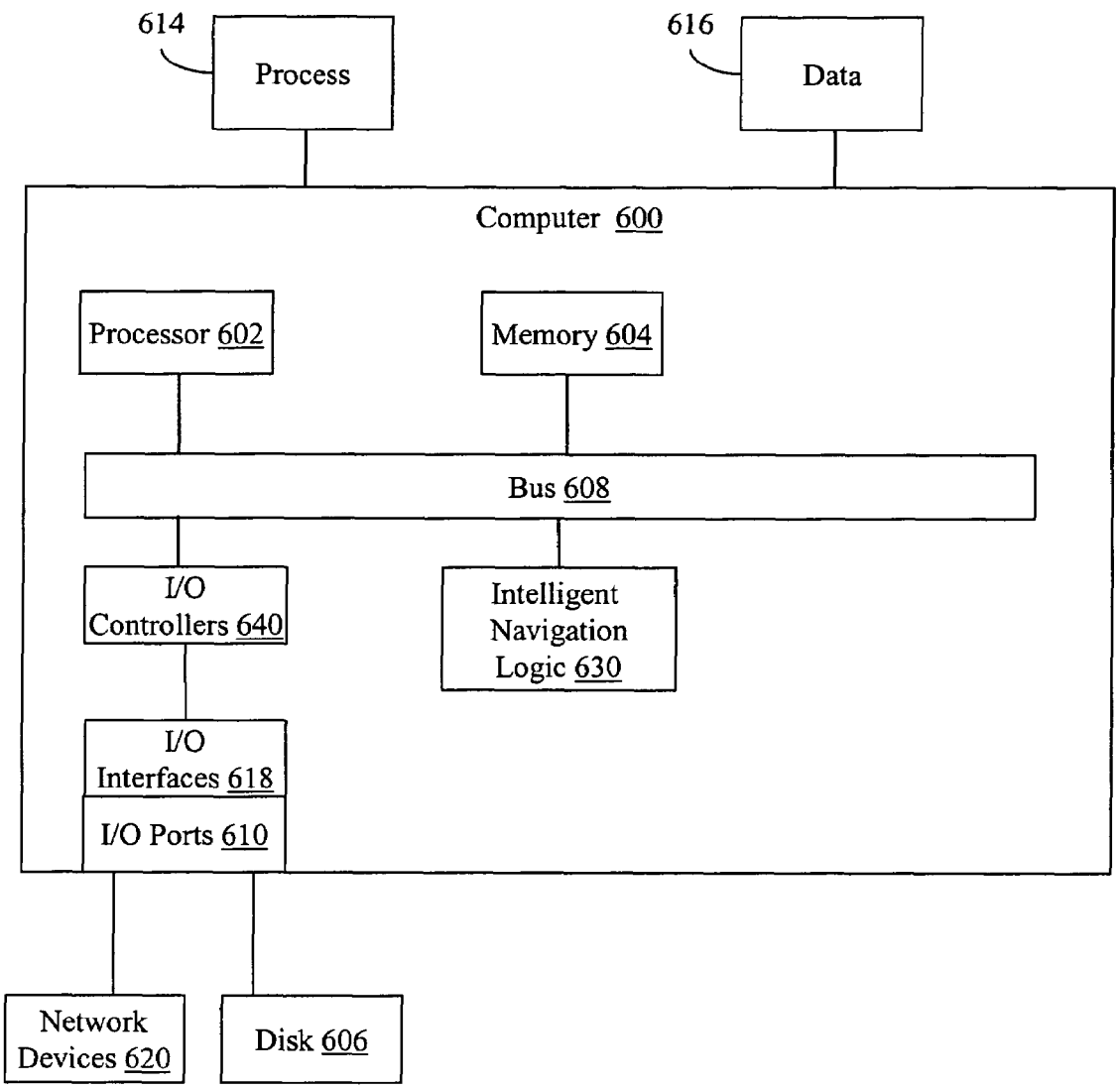
FIG. 6 illustrates an example computing environment in which example systems and methods illustrated herein can operate.

FIG. 6 illustrates an example computing device in which example systems and methods described herein, and equivalents, can operate. The example computing device may be a computer 600 that includes a processor 602, a memory 604, and input/output ports 610 operably connected by a bus 608. In one example, computer 600 may include an intelligent navigation logic 630 configured to facilitate providing intelligent navigation for a GUI associated with computer 600 and/or an application running on computer 600. While intelligent navigation logic 630 is illustrated as a hardware component operably connected to bus 608, it is to be appreciated that in one example intelligent navigation logic 630 may be implemented as software stored on disk 606, brought into memory 604 as a process 614, and executed by processor 602.

Intelligent navigation logic 630 may provide means (e.g., hardware, software, firmware) for managing top-level windows and related mid-level windows, means (e.g., hardware, software, firmware) for non-linearly navigating between related windows, and means (e.g., hardware, software, firmware) for coordinating navigation between windows and managing resources associated with windows.

Generally describing an example configuration of computer 600, processor 602 can be a variety of various processors including dual microprocessor and other multi-processor architectures. Memory 604 can include volatile memory and/or non-volatile memory. The non-volatile memory can include, but is not limited to, ROM, PROM, EPROM, EEPROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

Disk 606 may be operably connected to computer 600 via, for example, an input/output interface (e.g., card, device) 618 and an input/output port 610. Disk 606 can include, but is not limited to, devices like a magnetic disk drive, a solid state disk drive, a floppy disk drive, a tape drive, a Zip drive, a flash memory card, and/or a memory stick. Furthermore, disk 606 can include optical drives like a CD-ROM, a CD recordable drive (CD-R drive), a CD rewriteable drive (CD-RW drive), and/or a digital video ROM drive (DVD ROM). Memory 604 can store processes 614 and/or data 616, for example. Disk 606 and/or memory 604 can store an operating system that controls and allocates resources of computer 600.

Bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). Bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

Computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and so on. Input/output ports 610 can include but are not limited to, serial ports, parallel ports, and USB ports.

Computer 600 can operate in a network environment and thus may be connected to network devices 620 via the i/o devices 618, and/or the i/o ports 610. Through network devices 620, computer 600 may interact with a network. Through the network, computer 600 may be logically connected to remote computers. The networks with which computer 600 may interact include, but are not limited to, a local area network (LAN), a wide area network (WAN), and other networks. Network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, network devices 620 can connect to WAN technologies including, but not limited to, point to point links, circuit switching networks (e.g., integrated services digital networks (ISDN)), packet switching networks, and digital subscriber lines (DSL).

Figure 7:
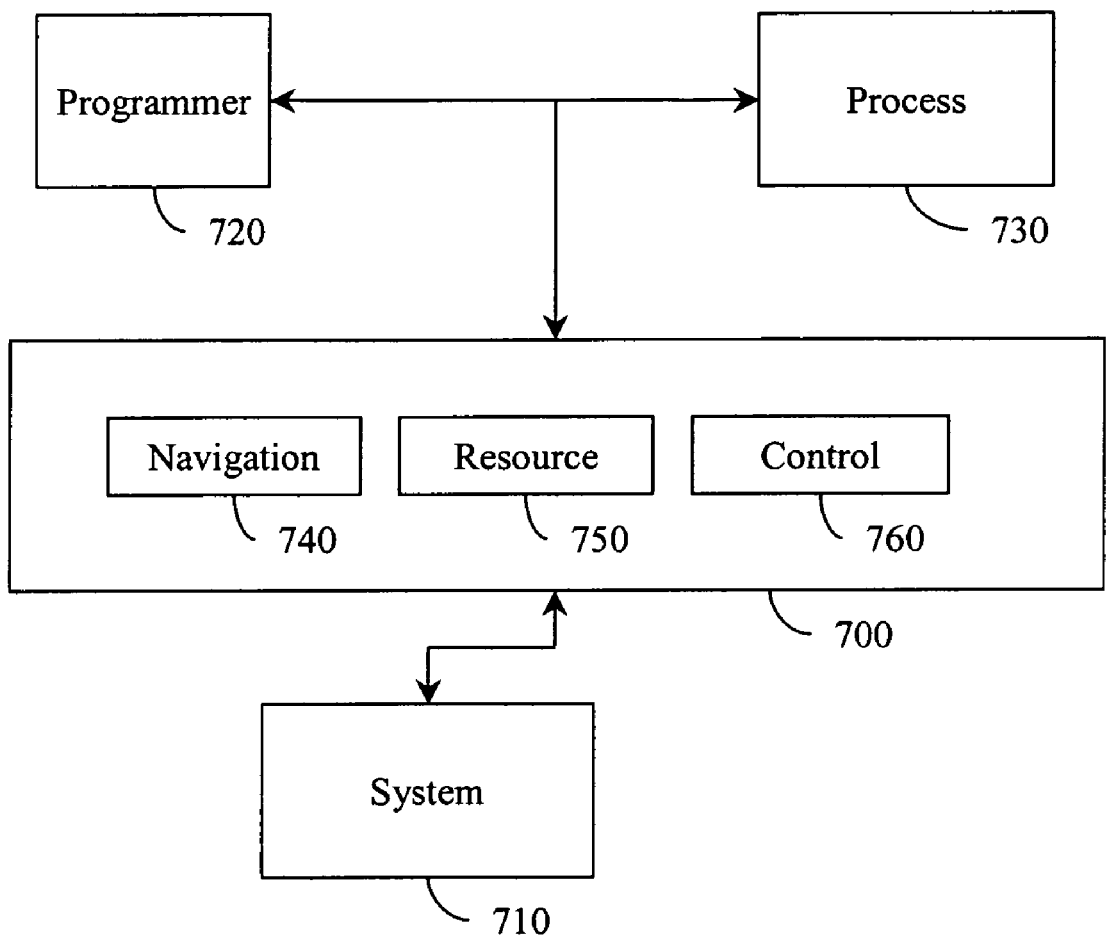
FIG. 7 illustrates an example application programming interface (API).

Referring now to FIG. 7, an application programming interface (API) 700 is illustrated providing access to a system 710 that provides intelligent navigation for a GUI. API 700 can be employed, for example, by a programmer 720 and/or a process 730 to gain access to processing performed by system 710. For example, a programmer 720 can write a program to access system 710 (e.g., invoke its operation, monitor its operation, control its operation) where writing the program is facilitated by the presence of API 700. Rather than programmer 720 having to understand the internals of system 710, programmer 720 merely has to learn the interface to system 710. This facilitates encapsulating the functionality of system 710 while exposing that functionality. Similarly, API 700 can be employed to provide data values to system 710 and/or retrieve data values from system 710. For example, a process 730 that processes navigation decisions can provide navigation data to system 710 via API 700 by, for example, using a call provided in the API 700.

In one example of API 700, a set of application programming interfaces can be stored on a computer-readable medium. The interfaces can be employed by a programmer, logic, and so on to gain access to system 710. The interfaces can include, but are not limited to, a first interface 740 that communicates a navigation data, a second interface 750 that communicates a resource data, and a third interface 760 that communicates a control data derived from the navigation data and the resource data. Navigation data may include, for example, an identifier of a window from which a navigation decision is made (e.g., navigation source) and a next window that a user wishes to visit (e.g., navigation target). Resource data may describe, for example, computer resources including memory, display space, and so on, that are being consumed by a window. Control information may include, for example, an identifier of a computer resource to be recycled, a window to be closed, a window to be opened, and so on.

Figure 8:
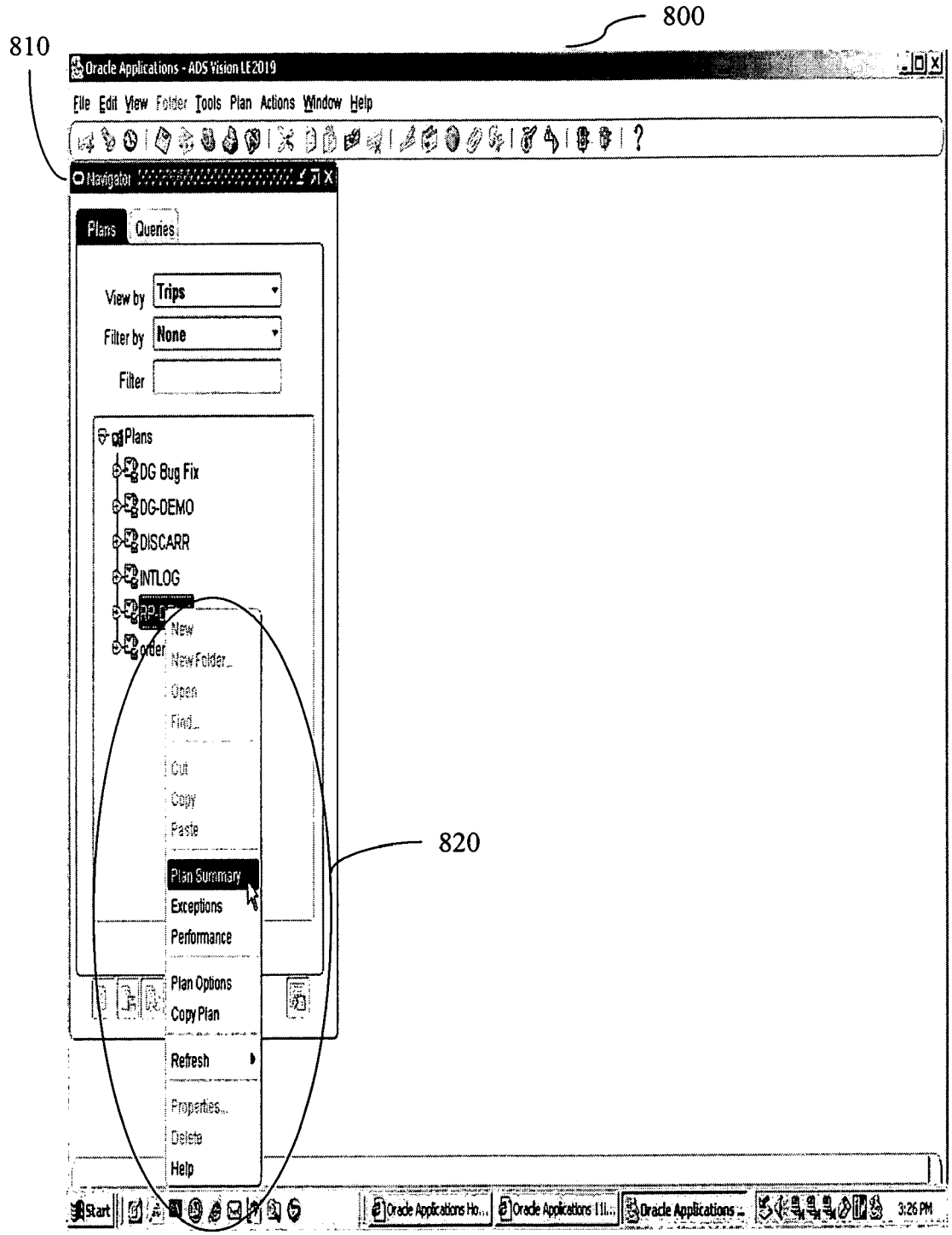
FIGS. 8-16 are simulated screenshots of a GUI configured to provide intelligent navigation in accordance with example systems and methods described herein.
Figure 9:
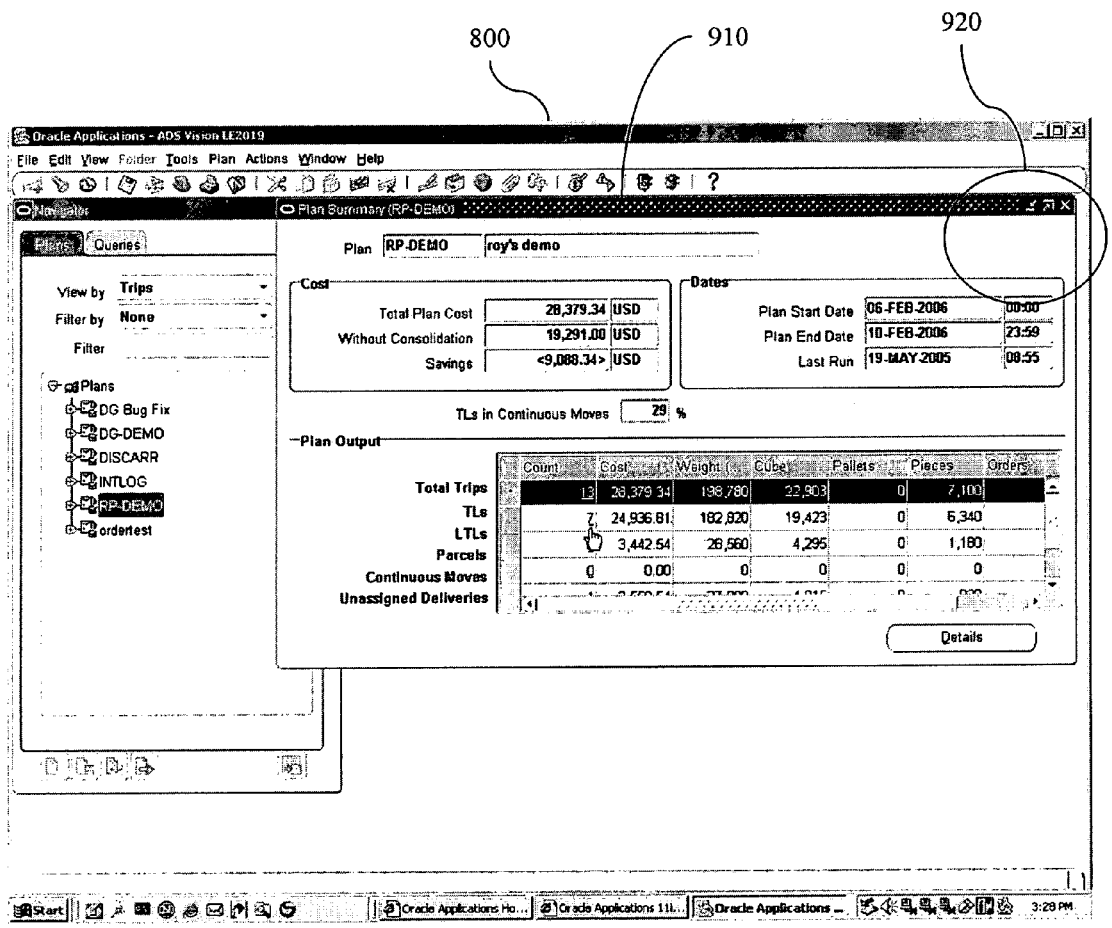

FIGS. 8 through 16 are simulated screenshots that illustrated various concepts associated with example systems and methods described herein. FIG. 8 illustrates a display 800 on which a navigator window 810 is available. In navigator 810, a menu 820 may facilitate selecting a top-level window (e.g., plan summary) to display. FIG. 9 includes a plan summary window 910. Plan summary 910 may be considered a top-level window. Thus, note that in region 920 there is no jump-back button. In mid-level windows, region 920 may display a control element (e.g., jump-back button). Various other windows may be navigated to from plan summary 910. For example, windows providing details about information provided on plan summary window 910 may be navigated to.

Figure 10:
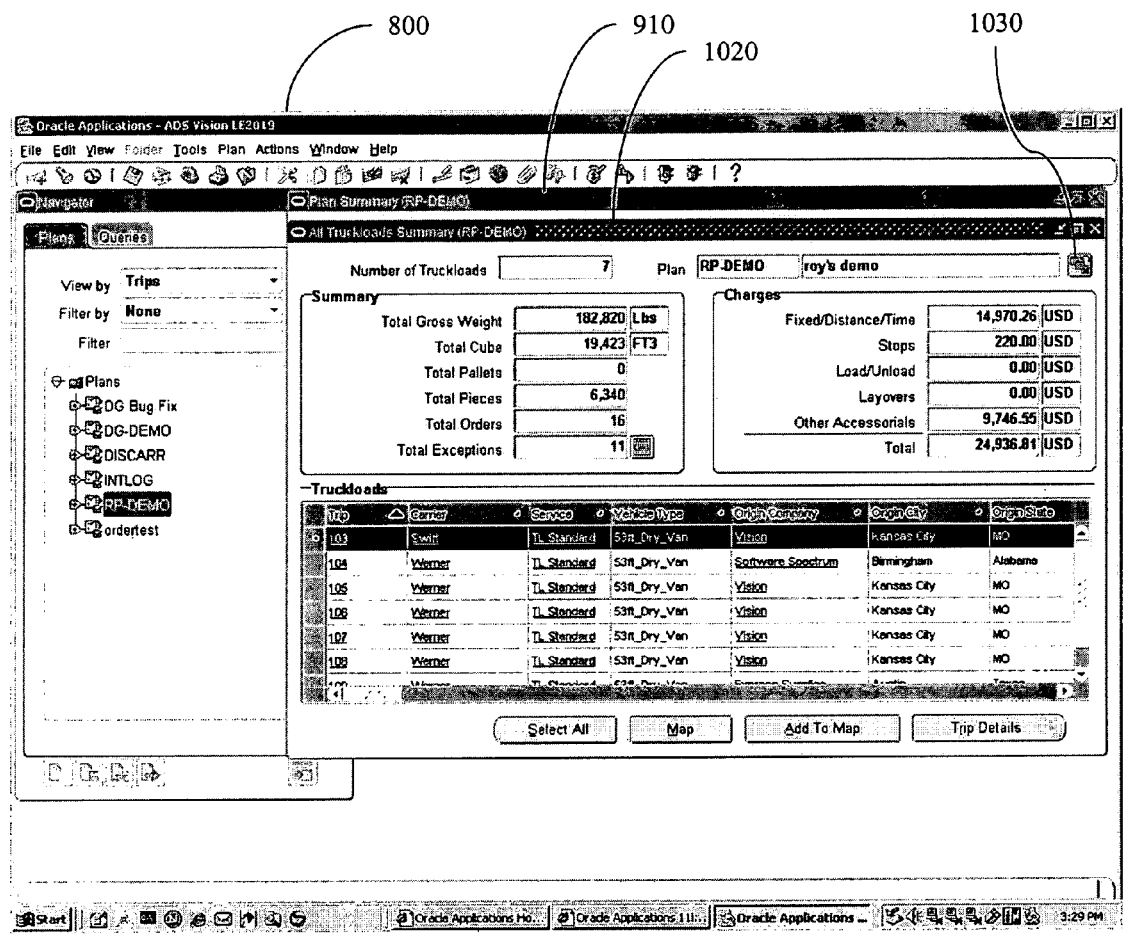
Figure 11:
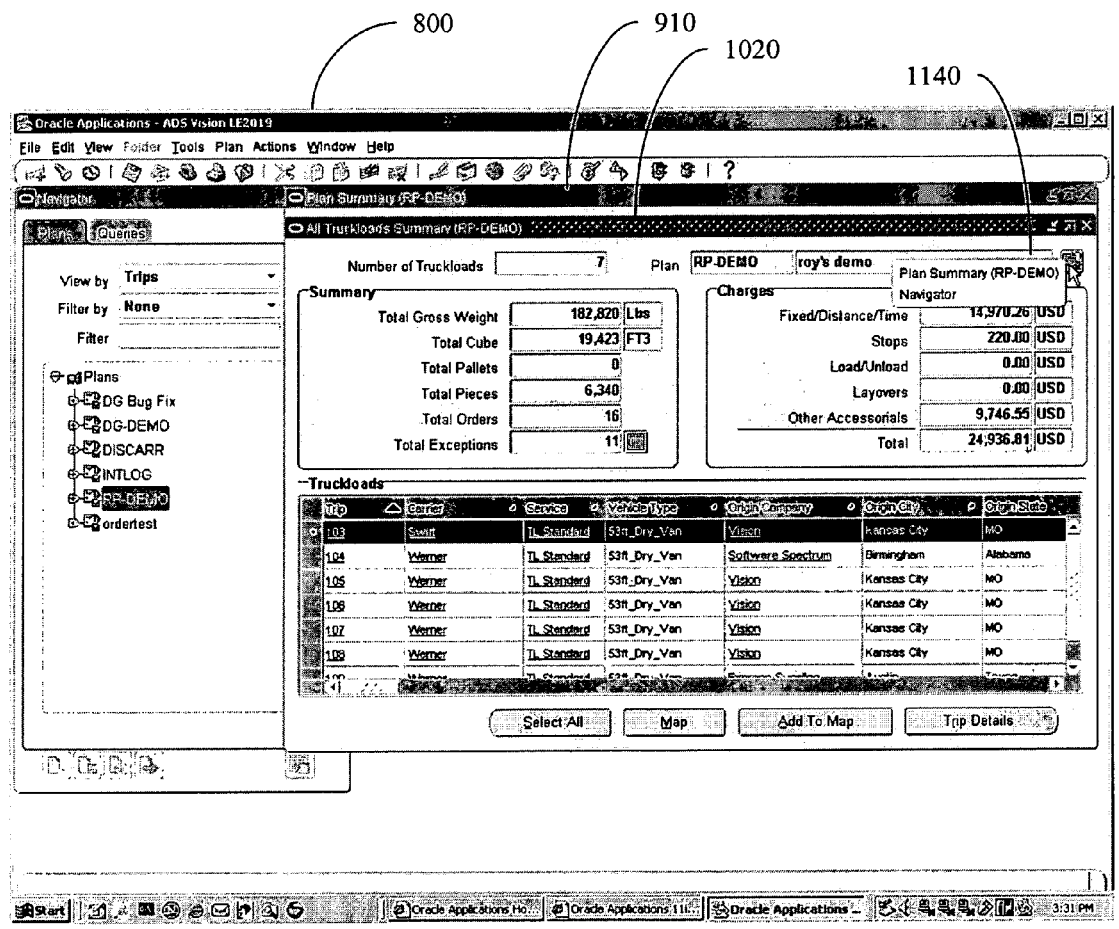

FIG. 10 illustrates the display 800, the top-level plan summary window 910 and a truckload summary window 1020 to which the user has navigated. Truckload summary window 1020 may be considered a mid-level window. Thus, note that a jump back button 1030 is available. From truckload summary window 1020 a user may navigate to various other windows including a truckload detail window. Additionally, the user may use jump back button 1030 to navigate back to previously visited windows. In FIG. 11, a user has selected the jump-back button and thus an ordered list 1140 of related, open, windows has been displayed. The user could select one of these entries to establish a navigation target. Additionally, the user could navigate to other windows available through data links in the truckload summary window 1020 and/or by using control elements (e.g., buttons) available on summary window 1020.

Figure 12:
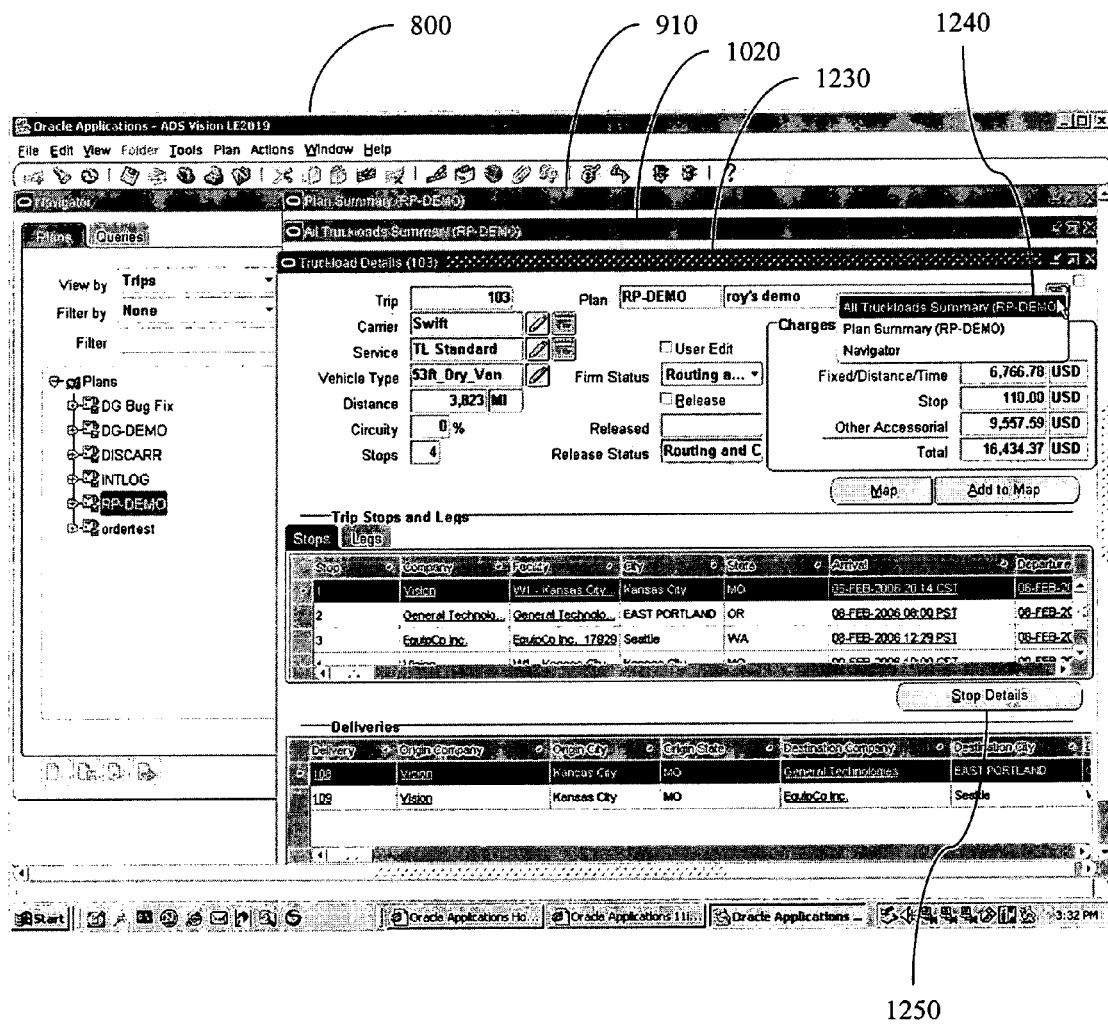
Figure 13:
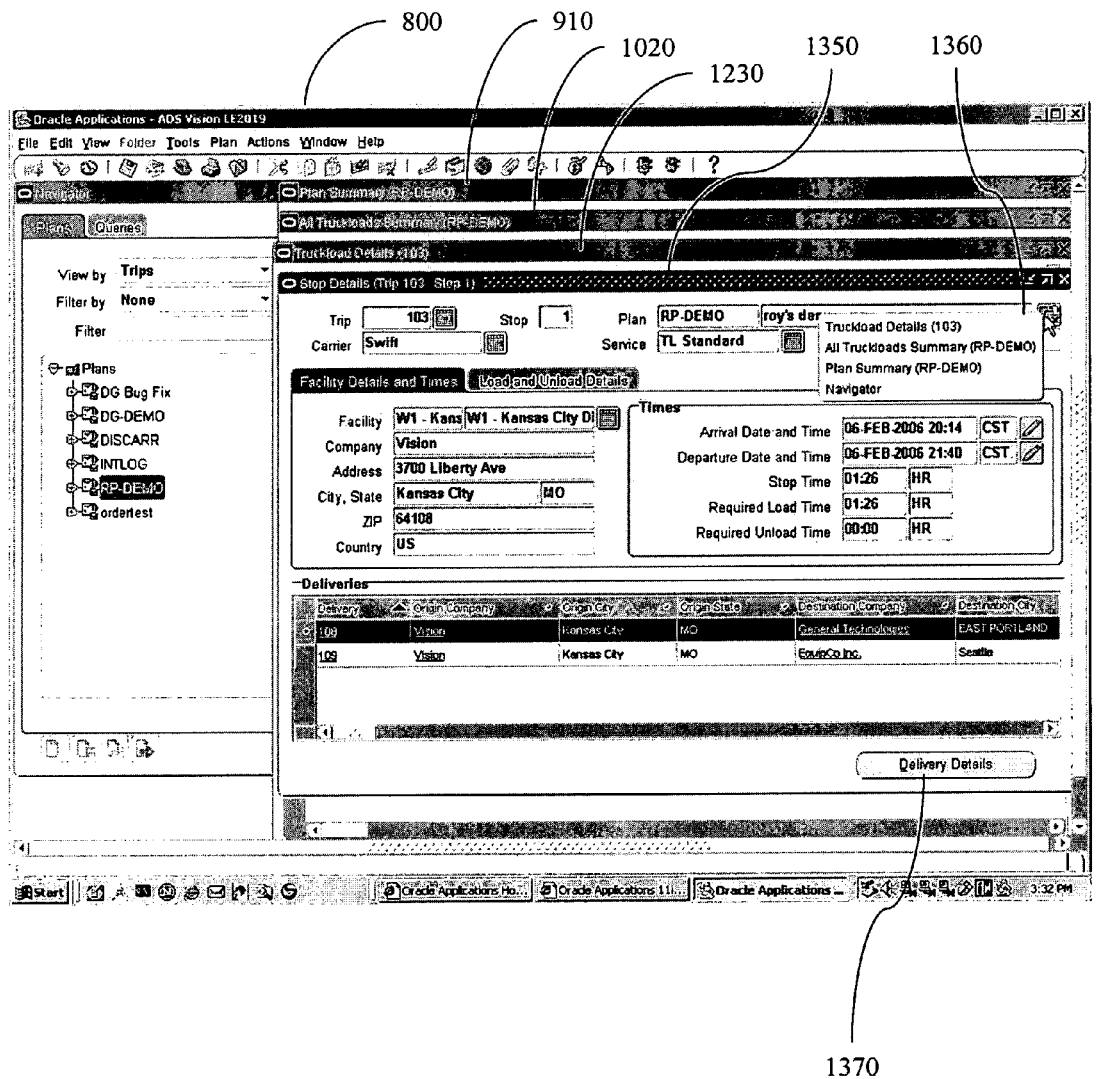

FIG. 12 illustrates display 800, top-level plan summary window 910, truckload summary window 1020, and a truckload detail window 1230. In FIG. 12, a user has once again selected the jump back button and thus an ordered list 1240 of open windows is displayed. List 1240 now includes links to the original navigator window, the plan summary window 910 and the truckloads summary window 1020. In this example, the open windows are listed most recently visited first. Once again, the user may use list 1240 to navigate backwards, may drill into data available on truckload details 1230, and/or may use a control element (e.g., Stop Details button 1250) to navigate to another window. Thus, FIG. 13 illustrates display 800 after a user has navigated to a stop details window 1350. By accessing a jump back button, an ordered list 1360 of open windows is made available. The user may select an entry on list 1360, may drill into data on stop details window 1350, and/or may use a control element (e.g., delivery details button 1370) to navigate to another window. Thus, FIG. 14 illustrates display 800 after a user has navigated to a delivery details window 1460. Once again, by accessing a jump back button, an ordered list 1470 of open windows is made available. The user may select an entry on list 1470, may drill into data on delivery details 1460, and/or may use a control element to navigate to another window.

Figure 15:
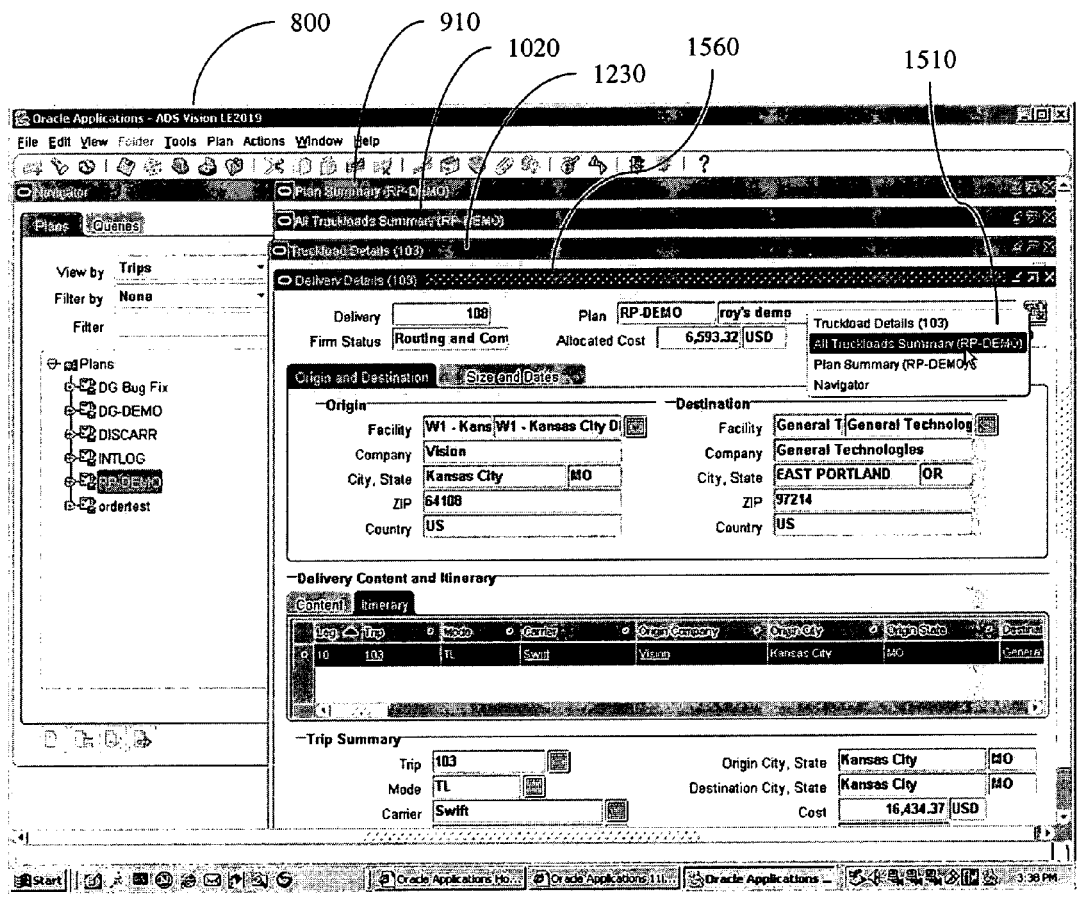
Figure 16:
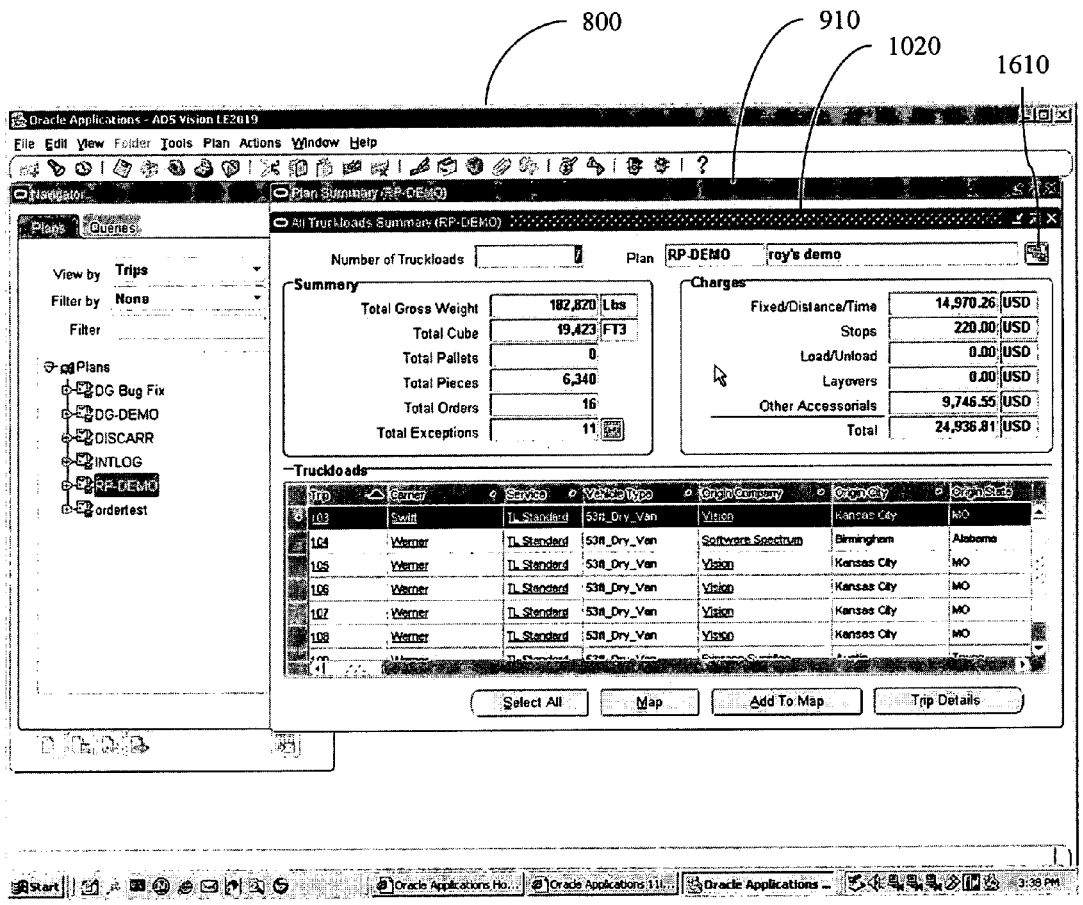

FIG. 15 illustrates display 800 after a user has moved focus (e.g., navigated) to a truckload details window and then drilled down to a delivery detail window 1560. In this example, a delivery details window GUI element has been reused and thus refreshed with different delivery data. Since this instance of delivery detail window 1560 was navigated to from truckload detail window 1230, and not from the stop details window 1350 (FIG. 13), a different ordered list 1510 is available. In ordered list 1510 the stop details window does not appear since it was not part of a navigation sequence that lead to the current window. Note also that on display 800 stop details window 1350 is still open but the truckload details window 1230 has two children, stop details window 1350 and delivery details window 1560. This display update (e.g., closing a window) and ordered list update (e.g., removing entry from list) can be performed by example systems and methods described herein. The change in relationship between windows and removal from ordered lists may facilitate removing a window from a separate drill-down sequence. In FIG. 15, the user has selected the truckload summary 1020 in ordered list 1510. Thus, in FIG. 16, truckload summary window 1020 has been brought forward, and its descendants (e.g., truckload details window 1230, delivery details window 1460) have been closed. Though not displayed, an ordered list available through jump back button 1610 would have entries for the truckload details window 1230 and delivery details window 1460 removed. Additionally, selecting truckload summary window 1020 has closed the stop details window 1350 and removed its entry from the ordered list since its parent was closed. This is but one example of non-linear navigation coupled with intelligent window closing.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methods for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computing system including a graphical user interface (GUI) system for an application where a plurality of windows can be opened and visited by a user, the system, tangibly embodied on a computer-readable storage medium, comprising:

a navigation logic configured to track and generate sequences of visited windows, where one window descends from another window in the sequence when the one window is visited after the another window; and a top-level logic configured to automatically close opened mid-level windows that descend from a first top-level window based on the sequences of visited windows upon determining that the first top-level window is revisited without closing the first top-level window.

2. The system of claim 1, the top-level logic also being configured to selectively close an open mid-level window descended from the first top-level window upon determining that a second top-level window is a navigation target.

3. The system of claim 1, where the navigation logic is further configured:

to display an ordered set of navigation links to candidate GUI navigation targets, a candidate GUI navigation target being a window to which a user has navigated;

to selectively close a descendant window; and to selectively remove an entry associated with the descendant window from the ordered set of navigation links upon determining that a mid-level window is a GUI navigation target.

4. The system of claim 1, including an attribute logic configured to store a user-determined attribute concerning a first instance of a user-manipulated window, and upon determining that a second instance of the user-manipulated window is a GUI navigation target to selectively configure the second instance of the user-manipulated window based, at least in part, on the attribute.

5. The system of claim 1, including a recycle logic configured to selectively recycle an instance of a GUI element upon determining that a pre-determined number of instances of the GUI element type are active and that an additional instance of the GUI element type has been requested.

6. The system of claim 5, where selectively recycling an instance of a GUI element includes replacing a first instance data associated with the GUI element with a second instance data associated with the additional instance of the GUI element.

7. The system of claim 3, a GUI navigation target being identifiable by a user selecting a link from the ordered set of navigation links.

8. The system of claim 1, the top-level logic being controllable, at least in part, by one or more user configurable parameters.

9. The system of claim 3, the navigation logic being controllable, at least in part, by one or more user configurable parameters.

10. The system of claim 4, the attribute logic being controllable, at least in part, by one or more user configurable parameters.

11. The system of claim 5, the recycle logic being controllable, at least in part, by one or more user configurable parameters.

12. The system of claim 1, a top-level window being:
a work flow starting point from which a sequence of related mid-level windows may be visited;
an ancestor of all mid-level windows visited in the sequence of windows, and
a descendant of no mid-level window visited in the sequence of windows.

13. The system of claim 12, a top-level window being defined by one or more of, a user, a system administrator, and an observation logic.

14. The system of claim 12, a mid-level window being a descendant of a top-level window and being configured to have zero or more descendants and one or more ancestors.

15. The system of claim 7, the navigation logic being configured:
to provide a GUI button configured to provide a non-linear navigation link to one or more windows previously visited and still open;
to determine that a navigation link has been selected;
to display a window associated with the navigation link;
to close a descendant of the window associated with the navigation link; and
to close a window in which the GUI button was displayed upon determining that a navigation link has been selected.

16. The system of claim 4, the user-determined attribute being one of, a window size, and a window location.

17. The system of claim 5, the recycle logic being configured to selectively reuse a GUI element upon one or more of, determining that a navigation target and a navigation source are both instances of the same GUI element type, and determining that a navigation target and a previous navigation target are both instances of the same GUI element type.

18. The system of claim 3, the navigation logic being configured to selectively update the ordered set of links upon one or more of, determining that a GUI navigation target and a GUI navigation source are both instances of the same GUI element type, and determining that a navigation target and a previous navigation target are both instances of the same GUI element type.

19. A graphical user interface (GUI) system, tangibly embodied on a computer-readable storage medium, comprising:
a control element configured to facilitate identifying a GUI navigation target;
a top-level logic configured to selectively close an open mid-level window upon determining one or more of, that a top-level window is a GUI navigation target, and that a top-level window from which the mid-level window descends is being closed;
a navigation logic configured:
to display an ordered set of navigation links to candidate GUI navigation targets, a candidate GUI navigation target being a window to which a user has navigated;
to selectively close a descendant window;
to selectively remove an entry associated with the descendant window from the ordered set of navigation links upon determining that a mid-level window is a GUI navigation target;
to provide a GUI button configured to provide a non-linear navigation link to one or more windows previously visited and still open;
to determine that a navigation link has been selected;
to display a window associated with the navigation link;
to close a descendant of the window associated with the navigation link;
to close a window in which the GUI button was displayed upon determining that a navigation link has been selected, and
to selectively update the ordered set of links upon one or more of, determining that a GUI navigation target and a navigation source are both instances of the same GUI element type, and determining that a navigation target and a previous navigation target are both instances of the same GUI element type;
an attribute logic configured to store a user-determined attribute concerning a first instance of a user-manipulated window, and upon determining that a second instance of the user-manipulated window is a GUI navigation target to selectively configure the second instance of the user-manipulated window based, at least in part, on the attribute; and
a recycle logic configured to selectively recycle an instance of a GUI element upon determining that a pre-determined, configurable number of instances of the GUI element type are open and that an additional instance of the GUI element type has been requested, the recycle logic also being configured to selectively reuse a GUI element upon one or more of, determining that a GUI navigation target and a GUI navigation source are both instances of the same GUI element type, and determining that a navigation target and a previous navigation target are both instances of the same GUI element type.

20. A method, comprising:
opening a plurality of windows on a display in a sequence of windows navigated by a user, the plurality of windows including a first top-level window configured to display in formation associated with an application, where the plurality of windows includes one or more mid-level windows configured to display information associated with the application, the mid-level windows being descended from the first top-level window based on the sequence of windows navigated by the user;

storing the sequence of windows navigated by the user; and upon determining that the first top-level window is being revisited without closing the first top-level window by the user, selectively closing one or more of the mid-level windows that descend from the first top-level window based on the sequence of windows navigated.

21. The method of claim 20, including upon determining that a second top-level window has been selected to be visited next, selectively closing one or more of, the first top-level window, and one or more mid-level windows descended from the first top-level window.

22. The method of claim 20, including relating a jump-sequence graphical user interface (GUI) element to one or more of the mid-level windows, the jump-sequence GUI element being configured to provide an ordered list of related visited, open windows associated with the application, and upon determining that the jump-sequence GUI element has been accessed:
  displaying the ordered list of related visited, open windows associated with the application;
  determining which visited, open window is a next window to be visited;
  closing one or more open windows that descend from the next window to be visited;
  bringing forward on a display the next window to be visited; and
  removing one or more entries from the ordered list of related, visited, open windows associated with the application.

23. The method of claim 22, including providing a recycle GUI element configured to selectively reuse a GUI element by replacing a first set of instance data associated with the GUI element with a second set of instance data associated with a new instance of the GUI element.

24. The method of claim 23, where a GUI element is selected for reuse upon determining one or more of, that a number of active instances of that GUI element type equals a threshold number of active instances for that GUI element type and that an additional instance of that GUI element type is requested, that the navigation target is of the same GUI element type as the navigation source and that the navigation source is about to be closed, and determining that a navigation target and a previous navigation target are both instances of the same GUI element type.

25. The method of claim 24, including upon determining that a user has manipulated a configuration of a manipulated window that is open, storing one or more attributes associated with the configuration of the manipulated window so that the one or more attributes survive closing of the manipulated window, and upon determining that the user is about to open a subsequent window instance having the same type as the manipulated window, configuring the subsequent instance according to the one or more attributes.

26. The method of claim 25, the top-level GUI element, the jump-sequence GUI element, and the recycle GUI element being objects.

27. A computer-readable storage medium storing processor executable instructions that when executed cause a computer to perform a method, the method comprising:

tracking and generating sequences of opened windows on a display, where one window descends from another window in the sequence when the one window is opened after the another window; and in response to detecting that a first top-level window has been revisited by a user without closing the top-level window, closing opened mid-level windows that descend from the first top-level window in the sequence of opened windows.

* * * * *

UNITED STATES PATENT AND TRADEMARK OFFICE
CERTIFICATE OF CORRECTION

PATENT NO. : 7,552,394 B2  Page 1 of 1
APPLICATION NO. : 11/242154
DATED : June 23, 2009
INVENTOR(S) : Roy Isa Peterkofsky et al.

It is certified that error appears in the above-identified patent and that said Letters Patent is hereby corrected as shown below:

On the Title page, in field (75), in column 1, in "Inventors", line 1, delete "San Fransicso," and insert -- San Francisco, --, therefor.

In column 9, line 40, delete "mid-leve" and insert -- mid-level --, therefor.

In column 14, line 32, delete "B&C" and insert -- B&C, --, therefor.

In column 16, line 64, delete "in formation" and insert -- information --, therefor.

Signed and Sealed this

Sixth Day of July, 2010

David J. Kappos
*Director of the United States Patent and Trademark Office*